United States Patent [19]
> Matsui et al.

[11] Patent Number: 4,884,184

[45] Date of Patent: Nov. 28, 1989

[54] CONTROL APPARATUS FOR CASCADED CONVERTER CIRCUIT

[75] Inventors: Takayuki Matsui, Hitachi; Toshiaki Okuyama, Ibaraki; Mitsugu Matsutake, Hitachi; Junichi Takahashi, Katsuta; Masami Ito, Hitachi, all of Japan

[73] Assignee: Hitachi, Ltd., Tokyo, Japan

[21] Appl. No.: 151,902

[22] Filed: Feb. 3, 1988

[30] Foreign Application Priority Data

Feb. 6, 1987 [JP] Japan .................................. 62-24561

[51] Int. Cl.$^4$ ............................................ H02M 1/14
[52] U.S. Cl. ........................................ 363/46; 363/68; 363/129
[58] Field of Search .................. 363/35, 37, 40, 71, 363/129, 44, 45, 46, 68

[56] References Cited

U.S. PATENT DOCUMENTS

| | | | |
|---|---|---|---|
| 4,126,892 | 11/1978 | Ekstrom et al. | 363/35 |
| 4,279,009 | 7/1981 | Andronov et al. | 363/35 |
| 4,308,575 | 12/1981 | Mase | 363/37 |
| 4,424,475 | 1/1984 | Godfroid | 363/37 |
| 4,555,752 | 11/1985 | Kurosawa | 363/129 |
| 4,618,923 | 10/1986 | Meisel et al. | 363/35 |
| 4,638,416 | 1/1987 | Neupauer et al. | 363/35 |
| 4,758,939 | 9/1988 | Matsuo et al. | 363/68 |

FOREIGN PATENT DOCUMENTS

| | | |
|---|---|---|
| 2543066 | 5/1976 | Fed. Rep. of Germany . |
| 2230981 | 7/1980 | Fed. Rep. of Germany . |
| 58-22582 | 2/1983 | Japan . |

OTHER PUBLICATIONS

Ishihara et al., "Application of New Drive Systems for Plate Mill Drives", IEEE-IAS84:38, pp. 43-48, 1984.
Sugi et al., "Microcomputer Based High Capacity Cycloconverter Drive for Main Rolling Mill", IPEC-Tokyo '83, pp. 744-755.

Primary Examiner—Patrick R. Salce
Assistant Examiner—Sterrett
Attorney, Agent, or Firm—Antonelli, Terry & Wands

[57] ABSTRACT

A converter circuit includes three-phase unit converters connected in cascade in two stages for supplying electric power to a load. In a region in which the converter output voltage ratio is small, the firing phases of both converters are so set that a phase difference of 120° makes appearance therebetween, while in a region in which the converter output voltage ratio is large, the firing phases are so set as to have a phase difference of 60° therebetween, whereby an angular difference of 90° to 30° is caused to occur constantly between the phases of voltage ripple components of the unit converters. Power factor of a power supply source is improved while ripple in the output voltage of the converter circuit is reduced.

14 Claims, 9 Drawing Sheets

CONTROL APPARATUS FOR CASCADED CONVERTER CIRCUIT

BACKGROUND OF THE INVENTION

The present invention relates in general to a converter control apparatus, and more particularly to a control apparatus for a converter circuit constituted by unit converters connected in cascade in a multiplicity of stages.

In general, an input current to a phase-controlled converter has a fundamental wave whose magnitude remains constant independent of the output voltage with only the power-factor angle varying. As the result, when the output voltage of the converter is lowered, a reactive power is increased, involving degradation in the power factor.

As a method of decreasing the reactive power, there is known, by way of example, a so-called asymmetrical control system in which individual converters are connected in cascade and operated in the vicinity of a maximum voltage of positive or negative polarity. For example, reference may be made to "APPLICATION OF NEW DRIVE SYSTEMS FOR PLATE MILL DRIVES" (IEEE-IAS84: 38, p.p. 43-48, 1984) and "MICROCOMPUTER-BASED HIGH CAPACITY CYCLOCONVERTER DRIVE FOR MAIN ROLLING MILL" (IPEC-Tokyo '83, p.p. 744-755). In these literatures, it is described that one stage of the cascaded converters is fixed at a maximum output voltage, while the output voltage of the other converter stage is regulated for controlling the output voltage of the cascaded converter circuit in a low voltage region (i.e. region in which the power factor is low).

As will be seen, the asymmetrical control system for the cascaded converter circuit known heretofore is designed to improve the power factor of the power supply source by setting the operating point of the unit converter, i.e. the base level of the sinusoidal output component of the unit converter, in the vicinity of the maximum voltage of positive or negative polarity. Consequently, a ripple component in the output voltage of the cascaded converter circuit varies in dependence on the firing phase or angle, giving rise to a phenomenon that the voltage ripple component is increased, which in turn results in generation of significant torque ripple and electromagnetic noise in case the load is an electric motor.

SUMMARY OF THE INVENTION

Accordingly, it is a first object of the present invention to reduce a ripple component in the output voltage of a cascaded converter circuit composed of unit converters connected in cascade.

A second object of the present invention is to decrease reactive power for thereby improving the power factor of a power source in addition to reduction of the ripple component.

A third object of the present invention is to provide a control circuit of relatively simplified structure for realizing the first and second objects mentioned above.

The output voltage of the unit converter contains a fundamental wave component determined by a voltage command and a periodical voltage ripple component (having a period corresponding to an electric angle of 60° in the case of a three-phase converter) resulting from the firing phase control. Consequently, when the voltage ripples in the output voltages of the cascaded converter stages constituting a converter circuit are in phase with one another, then a voltage ripple component having a magnitude increased by a factor correspondingly to the number of stages of the cascaded unit converters will make appearance in the output voltage of the cascaded converter circuit.

According to a first aspect of the present invention, it is proposed to regulate the firing phases or angles of the individual unit converters so that a predetermined angular difference is maintained among the phases of the ripple components in the output voltages of the unit converters.

According to a second aspect of the present invention, the value of the angular difference mentioned above is changed selectively in dependence on the magnitude of the voltage command t the cascaded converter circuit to thereby suppress generation of the voltage ripple to a minimum while allowing the operating point of the unit converters to be set in the vicinity of the maximum voltage of positive or negative polarity.

According to a third aspect of the present invention, means is provided for applying bias signals having polarities opposite to each other to phase control circuits provided in association with the unit converters, respectively, for accomplishing the aforementioned objects.

BRIEF DESCRIPTION OF THE DRAWINGS

Above and other objects, features and advantages of the present invention will become apparent upon consideration of the following description of the preferred embodiments thereof taken in conjunction with the accompanying drawings, in which:

FIGS. 2(a) to 2(h) are views showing waveforms for illustrating operation of a unit converter in general;

FIGS. 5(a) to 5(c) and FIGS. 6(a) to 6(c) are views showing waveform diagrams for illustrating relations existing between the voltage ripple components in the output voltages of the unit converters connected in cascade;

DESCRIPTION OF THE PREFERRED EMBODIMENTS

Now, the present invention will be described in detail in conjunction with preferred and exemplary embodiments thereof by reference to the accompanying drawings. Although the following description is made on the assumption that the unit converters are constituted by three-phase converters, respectively, wherein phases of the ripple components in the output voltages of the unit converters are maintained in a predetermined angular difference relation by using a firing phase bias signal, it should be understood that this is only by way of example, and the invention is never restricted to the assumption.

Figure 1:
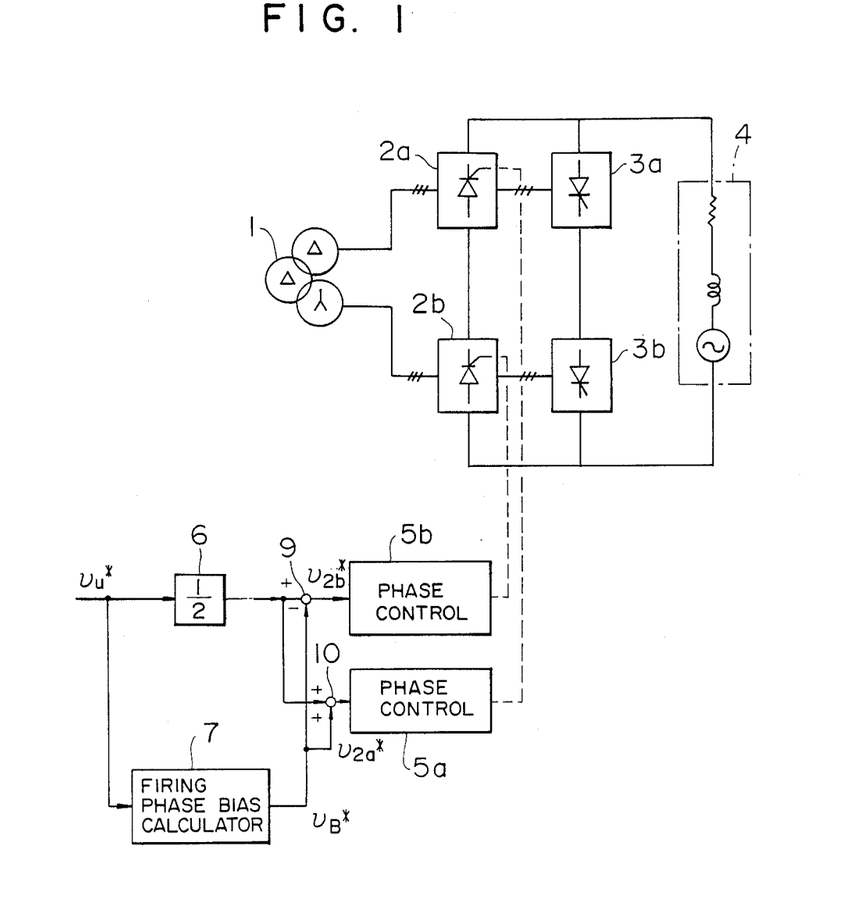
FIG. 1 is a view showing schematically a general arrangement of a cascaded converter circuit together with a control circuitry according to an exemplary embodiment of the present invention in which three-phase converters are employed as unit converters constituting the cascaded converter circuit.

FIG. 1 shows schematically a general arrangement of a cascaded converter circuit constituted by three-phase unit converters connected in cascade in two stages together with a control circuitry according to an embodiment of the invention.

Referring to FIG. 1, the illustrated cycloconverter is composed of the unit converters 2a and 2b disposed on the positive polarity side (hereinafter referred to as positive-side converter) and the unit converters 3a and 3b disposed on the negative polarity side (hereinafter referred to as negative-side converter), wherein the positive-side converters 2a and 2b and the negative-side converters 3a and 3b are connected to a power source transformer 1. It should be noted that the positive-side and negative-side converters shown in FIG. 1 presents one phase only and are connected to one phase of a multi-phase, for example, 3-phase AC motor 4 which is shown in an equivalent circuit diagram. The output voltages of the positive-side converters 2a and 2b are determined through phase control circuits 5a and 5b, respectively. It is to be noted that only the phase control circuits for the positive-side converters 2a and 2b are shown in FIG. 1.

The phase control circuits 5a and 5b serve to determine the firing angles for the positive-side converters 2a and 2b on the basis of output voltage commands $v_{2a}^*$ and $v_{2b}^*$ for these unit converters 2a and 2b, respectively.

A proportional gain circuit 6 serves to share an output voltage command $v_u^*$ for the cascaded converter circuit equally among the unit converters. In the case of the illustrative embodiment where the unit converters are cascaded in two stages, the proportional gain is set equal to ½. The output voltage command $v_u^*$ for the converter circuit is also inputted to a firing phase bias voltage arithmetic circuit (calculator) 7 which determines arithmetically the magnitude of the firing phase bias voltage $v_B^*$ such that the phase difference between the voltage ripple components in the output voltages of the unit converters 2a and 2b is maintained at an angle of 30° or alternatively at 90°. The firing phase biase voltage $v_B^*$ thus determined and outputted by the circuit 7 is applied to adders 9 and 10, respectively, with polarities opposite to each other.

Next, description will be turned to the operation of the system shown in FIG. 1.

Figure 2:
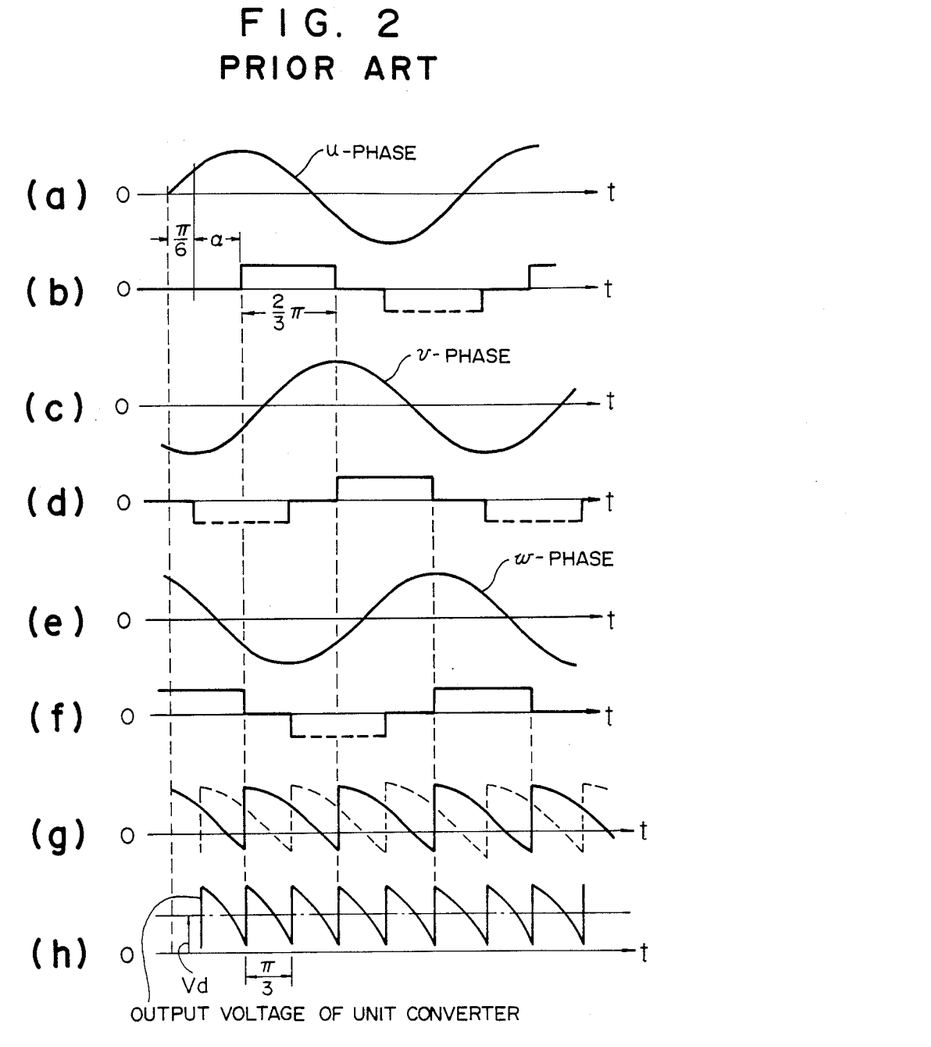

FIGS. 2(a) to 2(h) show waveform diagrams for illustrating operation of the unit converter 2a for producing a DC voltage represented by $V_d$. Referring to FIGS. 2(b), 2(d) and 2(f), each of rectangular waveforms having a duration $2\pi/3$ represents a current conduction period in each phase. As will be seen in FIG. 2(h), the output voltage of the unit converter contains a voltage component $V_d$ of a magnitude determined in dependence on a phase control angle $\alpha$ and a voltage ripple component having a period of 60°. It should be mentioned that the rectangular waveforms depicted in solid line and broken line in FIGS. 2(b), 2(d) and 2(f) represent the current conduction periods in the positive and negative arms of the unit converters interconnected in three-phase bridge configuration.

Figure 3:
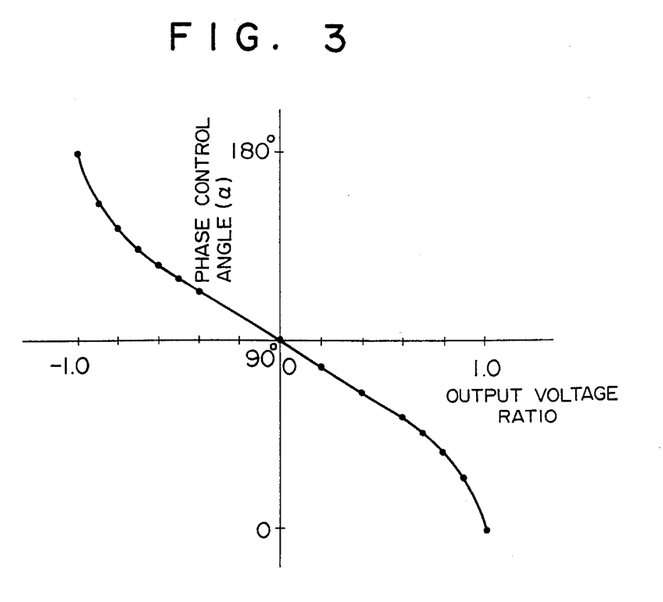
FIG. 3 is a view for graphically illustrating a relation between an output voltage ratio and a phase control angle in a unit converter.
Figure 4:
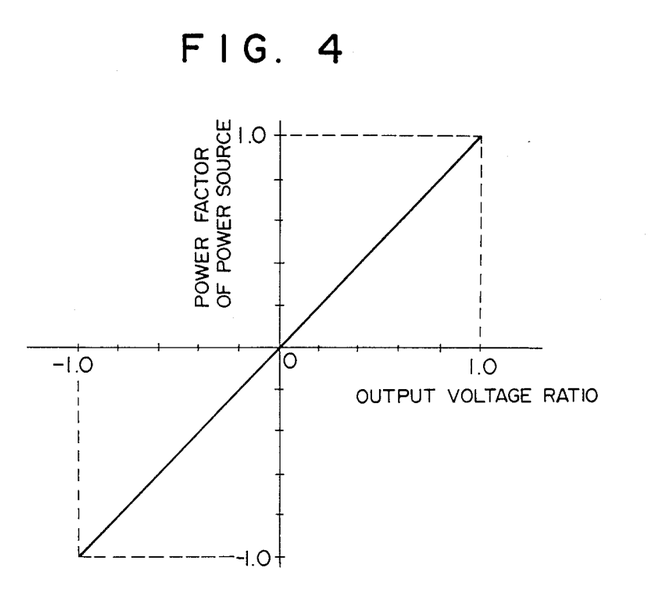
FIG. 4 is a view for graphically illustrating a relation between the output voltage ratio of the unit converter and power factor of a power source.

There exists such a relation as illustrated in FIG. 3 between the output voltage ratio, i.e. the ratio of an actual output voltage to the possible maximum output voltage, of the fundamental wave component in the output voltage of the unit converter and the phase control angle $\alpha$. In other words, the characteristic curve illustrated in FIG. 3 represents the input/output characteristic of each of the phase control circuit 5a and 5b. Further, the power factor of the power source 1 bears such a relationship as graphically depicted in FIG. 4 relative to the output voltage ratio of the fundamental wave component in the output voltage produced by the unit converter. Under the circumstance, it is a common practice that the unit converters 2a and 2b are connected in cascade, wherein when the output voltage of the cascaded converter circuit is to be at a low level, one of the unit converter 2a and 2b is fixed at its maximum DC output voltage while the other unit converter is phase-controlled to produce an output voltage which provides, in combination of the maximum DC output voltage, a desired AC output, thereby improving the power factor of the power supply source.

Figure 5:
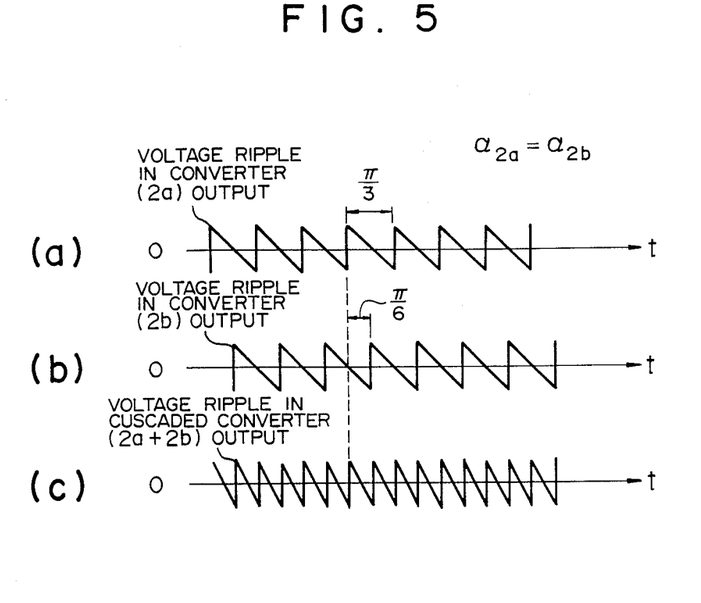
Figure 6:
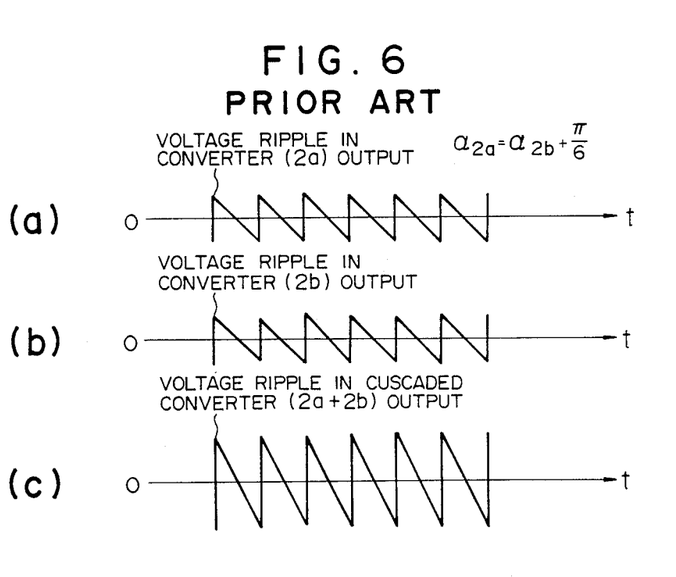

In order to reduce harmonic components of the power source, the unit converters 2a and 2b are connected to delta-connection and Y-connection of the source transformer 1, respectively. As a result, when equal output voltage commands are issued to the unit converters 2a and 2b, respectively, a phase difference of 30° makes appearance between the voltage ripple components in the output voltages of the unit converters 2a and 2b. This relation is graphically illustrated in FIGS. 5(a) to 5(c). Since the phase control angles $\alpha_{2a}$ and $\alpha_{2b}$ of the unit converters 2a and 2b are equal to each other, phases of the voltage ripples of these converters 2a and 2b differ from each other by the phase difference of 30° in the supplied voltages from the power source 1, as will be seen in FIGS. 5(a) and 5(b), as the result of which the ripple component in the output voltage of the cascaded converter circuit constituted by the unit converters 2a and 2b has an amplitude or magnitude equal to that of the ripple component in the output voltage of each unit converter and a frequency which is twice as high as that of the latter, as will be seen in FIG. 5(c). It is however noted that when the phase control angles $\alpha_{2a}$ and $\alpha_{2b}$ are equal to each other, the power factor of the power source will become degraded in case the output voltage of the cascaded converter circuit is low. To evade such undesirable situation, the firing phase bias voltage is added for increasing the operating point, as will be described below. When the output voltage commands for the unit converters 2a and 2b differ from each other, phase of the voltage ripple resulting from increasing the phase control angle $\alpha_{2a}$, for example, by $\pi/6$ relative to the phase control angle $\alpha_{2b}$ is equal to a sum of the difference in the phase control angle and the input phase difference of 30°. This relation is illustrated in FIGS. 6(a) to 6(c). In this case, the ripple components in the output voltages of the unit converters 2a and 2b are in phase with each other, as will be seen in FIGS. 6(a) and 6(b). Consequently, the amplitude of the ripple component in the output voltage of the cascaded converter circuit is twice as high as that of the ripple component in output voltage of the individual unit converter. (In more general terms the, amplitude or magnitude of the voltage ripple component of the converter circuit assumes a value equal to that of the single unit converter multiplied with the number of cascaded stages of the unit converters constituting the converter circuit.)

Under the circumstances, the following control procedure is proposed by the present invention.

In the firing phase bias voltage arithmetic circuit 7, such firing phase bias voltage $v_B^*$ is arithmetically determined in which the phase difference between the ripple components in the output voltages of the unit converters 2a and 2b assumes 30° or 90°, wherein the output voltage command to one of the unit converters 2a or 2b is added with the firing phase bias voltage $v_B^*$ thus determined, while the bias voltage $v_B^*$ is subtracted from the output voltage command to the other unit converter 2b or 2a. As the consequence, the effects of the firing phase bias voltages on the output voltages of the respective unit converts are cancelled out with each other in the output voltage of the cascaded converter circuit constituted by the unit converters, resulting in that the output voltage of magnitude commanded by the output voltage command $v_u^*$ is produced by the converter circuit.

Now, the principle underlying the control method according to the present invention as briefed above will be elucidated below in more detail.

When the phase control angles of the unit converters 2a and 2b are represented by $\alpha_{2a}$ and $\alpha_{2b}$, respectively, the output voltages $v_{2a}$ and $v_{2b}$ of the unit converters 2a and 2b are, respectively, given by the following expressions:

$$v_{2a} = E_{dm} \cdot \cos \alpha_{2a} \qquad (1)$$
$$v_{2b} = E_{dm} \cdot \cos \alpha_{2b}$$

where $E_{dm}$ represents the maximum output voltage of the unit converter. Now, assume that the firing phase bias voltage is represented by $v_B$ and the output voltage of the cascaded converter circuit constituted by the unit converters 2a and 2b is represented by $v_u$. Then, the following relations apply valid.

$$v_{2a} = \frac{v_u}{2} + v_B \qquad (2)$$
$$v_{2b} = \frac{v_u}{2} - v_B$$

When the ratio of the firing phase bias voltage $v_B$ to the maximum output voltage $E_{dm}$ of the unit converter is represented by $l$ with the voltage ratio of the output voltage $V_u/2$ of the unit converter to the maximum output voltage $E_{dm}$ thereof being represented by $\gamma$, the following relations can be derived from the expressions (1), (2) and (3).

$$\alpha_{2a} = \cos^{-1}(\gamma + l) \qquad (3)$$
$$\alpha_{2b} = \cos^{-1}(\gamma - l)$$

On the basis of the above expression (3), the difference in the phase control angle between the unit converters 2a and 2b can be determined as follows:

$$\alpha_{2b} - \alpha_{2a} = \cos^{-1}(\gamma - l) - \cos^{-1}(\gamma + l) \qquad (4)$$
$$= \cos^{-1}[(\gamma - l)(\gamma + l) + \sqrt{\{1 - (\gamma - l)^2\}\{1 - (\gamma + l)^2\}}\,]$$

From the above expression (4), there can be determined the ratio l at which the phase difference in the ripple voltage between the unit converters 2a and 2b is 30° or 90°. Namely, in order that the phase difference in the voltage ripple between the unit converters 2a and 2b is to be 30° or 90°, the difference in the phase control angle between the unit converters 2a and 2b must be 60° or 120° because the phase difference of 30° in the power supply source has to be taken into account, as described hereinbefore. In the first place, let's determine the ratio l or the magnitude of the firing phase bias voltage at which the firing phase difference between the unit converters 2a and 2b is 60°. Since $$\cos(\alpha_{2b} - \alpha_{2a}) = \cos\frac{\pi}{3} \qquad (5)$$
$$= \frac{1}{2}$$

the expression (4) can be rewritten for the ratio l as follows:

$$l^2 = \frac{1}{4} - \frac{\gamma^2}{3} \qquad (6)$$

where $$(\gamma - l)(\gamma + l) \leq \frac{1}{2} \qquad (7)$$

Thus, so far as $\gamma \leq \sqrt{3}/2$, the ratio l can be given by $$l = \sqrt{\frac{1}{4} - \frac{\gamma^2}{3}} \qquad (8)$$

Accordingly, from the expression (8), the firing phase bias voltage $v_B$ at which the firing phase difference between the unit converters is 60° can be determined as follows:

$$v_B = E_{dm} \cdot \sqrt{\frac{1}{4} - \frac{v_u^2}{12 \cdot E_{dm}^2}} \qquad (9)$$
$$= \frac{E_{dm}}{2} \cdot \sqrt{1 - \frac{1}{3}\left(\frac{v_u}{E_{dm}}\right)^2}$$

The firing phase bias voltage $v_B$ which can minimize the voltage ripple at the firing phase difference of 120° can also be determined in the same manner as in the case of the firing phase difference of 60°. More specifically, the ratio l of the firing phase bias voltage to the maximum output voltage $E_{dm}$ of the unit converter for the firing phase difference of 120° between the unit converters is first determined. Since $$\cos(\alpha_{2b} - \alpha_{2a}) = \cos\frac{2}{3}\pi \quad (10)$$
$$= -\frac{1}{2}$$

the expression (4) can be rewritten for the ratio l as follows:

$$l^2 = \frac{3}{4} - 3\gamma^2 \quad (11)$$

where $$(\gamma - l)(\gamma + l) \leq -\frac{1}{2} \quad (12)$$

From the expressions (11) and (12), $$l = \frac{\sqrt{3}}{2} \cdot \sqrt{1 - 4\gamma^2} \quad (13)$$

where $\gamma \leq \frac{1}{2}$.

On the basis of the expression (13), there can be determined the firing phase bias voltage $v_B$ at which the firing phase difference between the unit converters $2a$ and $2b$ is 120°, as follows;

$$v_B = E_{dm} \cdot \frac{\sqrt{3}}{2} \cdot \sqrt{1 - \left(\frac{V_u}{E_{dm}}\right)^2} \quad (14)$$

Figure 7:
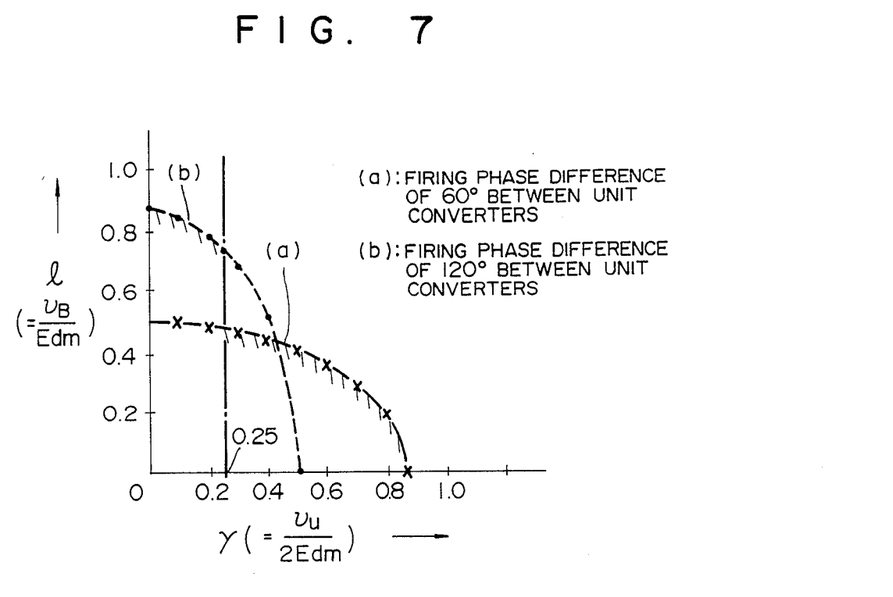
FIG. 7 is a view for illustrating graphically characteristics of firing phase bias voltages for maintaining the firing phase difference between the unit converters at predetermined angles.

On the basis of the expressions (8) and (13) which define the magnitudes of the firing phase bias voltages for making the firing phase difference between the unit converters be 60° and 120°, respectively, there can be obtained such characteristic curves as illustrated in FIG. 7, in which a solid line curve (a) represents the relation between the voltage ratios $\gamma$ and l for the firing phase difference of 60° between the unit converters while a broken line curve (b) represents the similar relation for the firing phase difference of 120° between the unit converters. In order to reduce the reactive power input to the unit converter, it is desirable to set the operating point of the unit converter closer to the maximum voltage of positive or negative polarity. This can be accomplished by selecting the value of the firing phase bias voltage as large as possible in dependence on the output voltage of the unit converter. To this end, a large value may be selected for the ratio l of the firing phase bias voltage ($v_B$) to the maximum output voltage $E_{dm}$ of the unit converter in dependence on the voltage ratio $\gamma$ of the output voltage $V_u/2$ of the unit converter to the maximum output voltage $E_{dm}$ thereof, as will be seen from the characteristic diagram shown in FIG. 7. Parenthetically, the value of the voltage ratio $\gamma$ at which the firing phase difference between the unit converters can be 120° is equal to or smaller than 0.25, as will be seen from the expression (12). Accordingly, by selecting the value of the firing phase bias voltage in accordance with the broken line curve (b) shown in FIG. 7 so that the firing phase difference between the unit converters is 120° for the voltage ratio $\gamma$ equal to or smaller than 0.25, while selecting the value of the firing phase bias voltage in accordance with the solid line curve (a) shown in FIG. 7 so that the firing phase difference is 60° for the voltage ratio $\gamma$ greater than 0.25, not only the ripple component in the output voltage of the cascaded converter circuit constituted by the unit converters can be reduced to a minimum, but also the power factor of the power source can be improved because the operating point may be set at high level.

Figure 8:
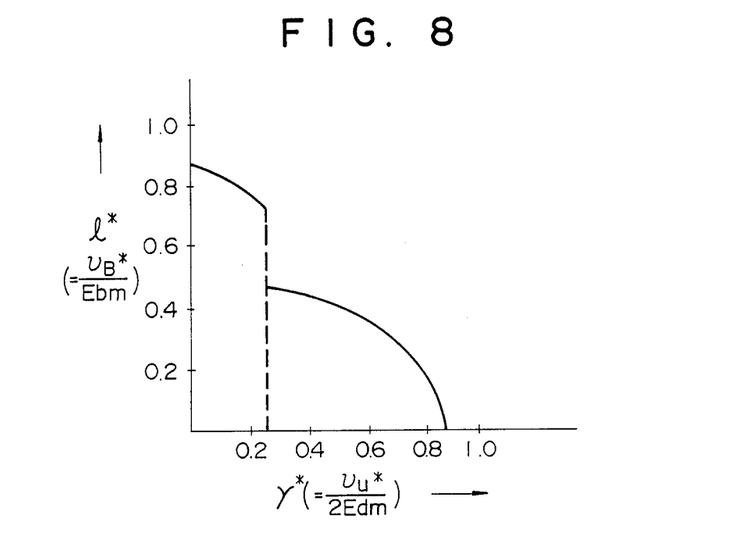
FIG. 8 is a view for illustrating graphically the input/output characteristic of a firing phase bias voltage arithmetic circuit (calculator circuit) shown in FIG. 1.

The firing phase bias voltage arithmetic circuit 7 may be implemented by a function generator which can output a voltage ratio $l^*$ ($=v_B^*/E_{dm}$) for a voltage ratio $\gamma^*$ of an output voltage command $v_u^*$ for the cascaded converter circuit to the maximum output voltage $2 \cdot E_{dm}$ thereof, as illustrated in a characteristic diagram shown in FIG. 8.

Figure 9:
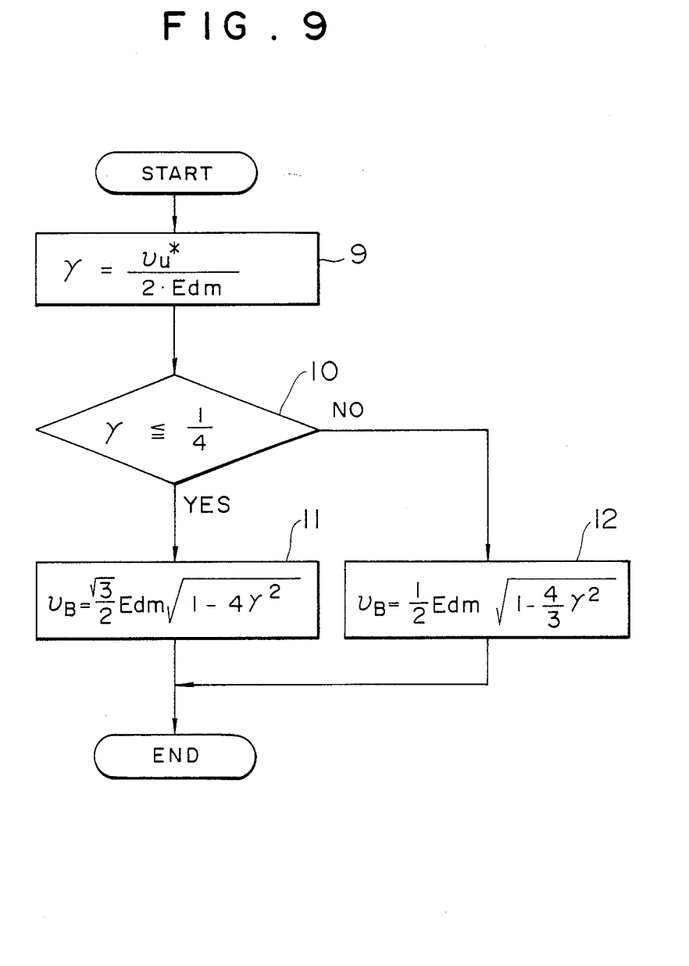
FIG. 9 is a view for illustrating in a flow chart a processing for realizing the input/output characteristic show in FIG. 8 through digital operation procedure.

Alternatively, the firing phase bias voltage arithmetic circuit may be implemented by a microprocessor programmed to execute the requisite arithmetic operations. FIG. 9 shows in a flow chart a procedure for executing the arithmetic operations. Referring to the figure, at a block (or step) 9, the voltage ratio $\gamma$ of the output voltage command $v_u^*$ for the cascaded converter circuit to the maximum output voltage $2 \cdot E_{dm}$ thereof is arithmetically determined, being followed by a block 10 where the voltage ratio $\gamma$ is compared with the value of 0.25. When the voltage ratio $\gamma$ is equal to or smaller than 0.25, the firing phase bias voltage $v_B$ at which the firing phase difference between the unit converters is an angle of 120° is arithmetically determined to be outputted at a block 11. On the other hand, when the voltage ratio $\gamma$ is greater than 0.25, the firing phase bias voltage at which the firing phase difference between the unit converters becomes equal to 60° is arithmetically determined in a block 12.

Figure 10:
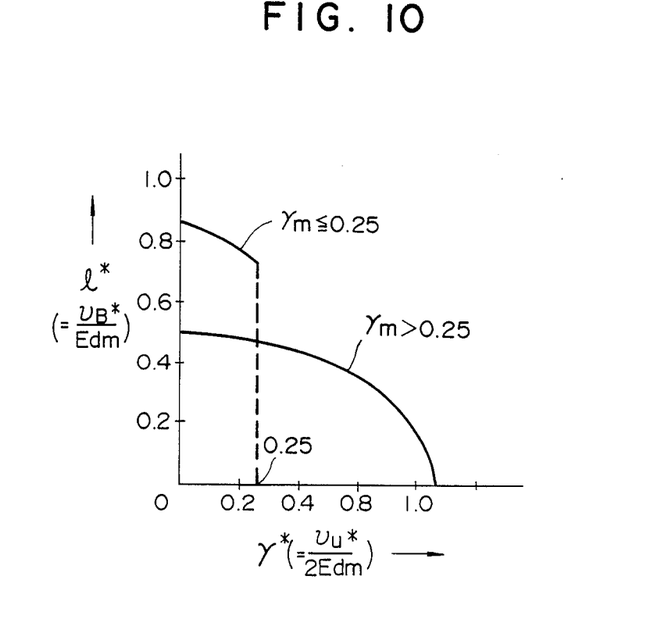
FIG. 10 is a view for illustrating graphically another input/output characteristic of the firing phase bias voltage arithmetic circuit shown in FIG. 1.

FIG. 10 shows another input/output characteristic of the firing phase bias voltage arithmetic circuit 7, which characteristic differs from the one shown in FIG. 8 in that the voltage command $v_u^*$ which varies continuously in sinusoidal form with respect to a time is used in the case of the latter, while in the case of the former the maximum value of the output voltage command for the converter circuit is used. In other words, when the firing phase bias voltage arithmetic circuit 7 having the characteristic shown in FIG. 10 is employed, the maximum value of the sinusoidal voltage command signal is determined, wherein the firing phase difference between the unit converters is set at 60° or 120° in dependence on the maximum value as determined. More specifically, a voltage ratio $\gamma_m$ of a peak value $v_{um}^*$ for the converter circuit to the maximum output voltage $2 \cdot E_{dm}$ thereof is determined. When the voltage ratio $\gamma_m$ thus determined is equal to or smaller than 0.25, the firing phase difference between the unit converters is set at the angle of 120°. On the other hand, in case the voltage ratio $\gamma_m$ based on the peak value $v_{um}^*$ exceeds 0.25, firing phase difference between the unit converters is set at the angle of 60° as determined on the basis of the peak value $v_{um}^*$ in this case, even when the voltage ratio $\gamma$ of output voltage command $v_u^*$ to the maximum output voltage $2 \cdot E_{dm}$ of the converter circuit changing sinusoidally continuously should become equal to or smaller than 0.25.

Figure 11:
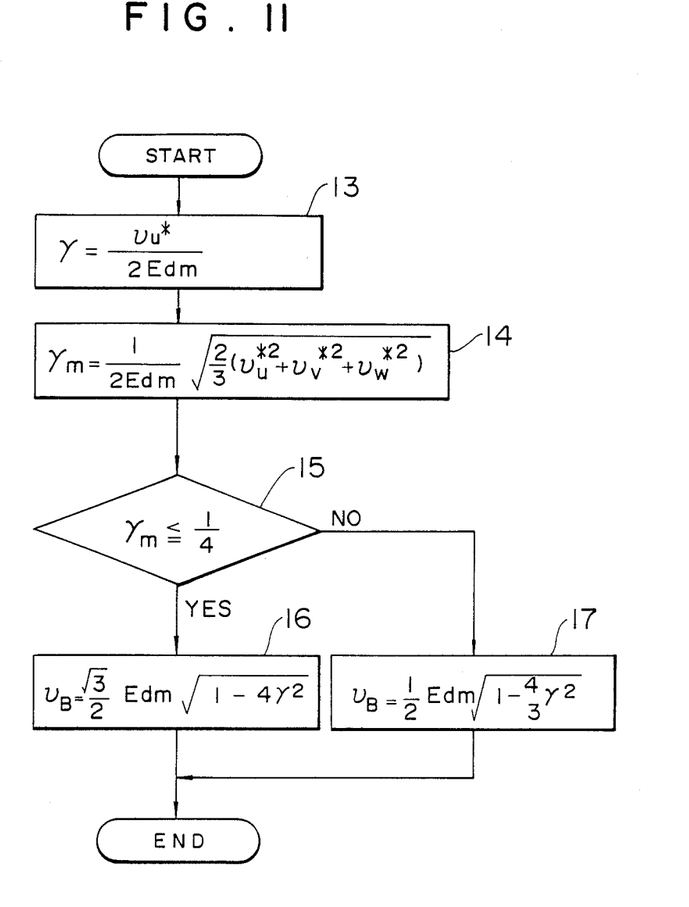
FIG. 11 is a view showing in a flow chart a processing for realizing the input/output characteristic shown in FIG. 10 through digital operation procedure.

FIG. 11 shows in a flow chart a procedure executed on the basis of the characteristics illustrated in FIG. 10 by the arithmetic circuit 7 implemented in the form of a microprocessor. Referring to FIG. 11, in a block (or step) 13, the voltage ratio $\gamma$ of the output voltage command $v_u^*$ to the maximum output voltage $2 \cdot E_{dm}$ of the converter circuit is arithmetically determined. Subsequently, in a block 14, the maximum value of the output voltage calculated from the commands $v_u^*$, $v_v^*$ and $v_w^*$ evaluate the $\gamma_m$, whereby the voltage ratio $\gamma_m$ is arithmetically determined from the maximum output voltage $2 \cdot E_{dm}$ of the converter circuit and the abovementioned maximum output voltage commands in accordance with the equation stated in the block 14. The voltage ratio $\gamma_m$ is then compared with 0.25 in a block 15. When the voltage ratio $\gamma_m$ is equal to or smaller than 0.25, the firing phase bias voltage $v_B$ at which the firing phase difference between the unit converters can assume 120° is arithmetically determined on the basis of the voltage ratio $\gamma$ in the block 14. On the other hand, when the voltage ratio $\gamma_m$ exceeds 0.25, the firing phase bias voltage $v_B$ at which the firing phase difference between the unit converters assumes the angle of 60° is arithmetically determined on the basis of the voltage ratio $\gamma_m$ determined in the block 13 to be thereby outputted (block 17).

With the characteristic illustrated in FIG. 10, the firing phase bias voltage can remain without being changed over so far as the voltage ratio $\gamma_m$ of the maximum value of the output voltage command to the maximum output voltage $2 \cdot E_{dm}$ of the cascaded converter circuit is greater than 0.25, even when the voltage ratio $\gamma$ derived from the output voltage command $v_u^*$ susceptible to instantaneous change becomes equal to or smaller than 0.25. Consequently, no steep change will occur in the output voltage of the unit converter. Thus, a preferred control performance can be assured.

Figure 12:
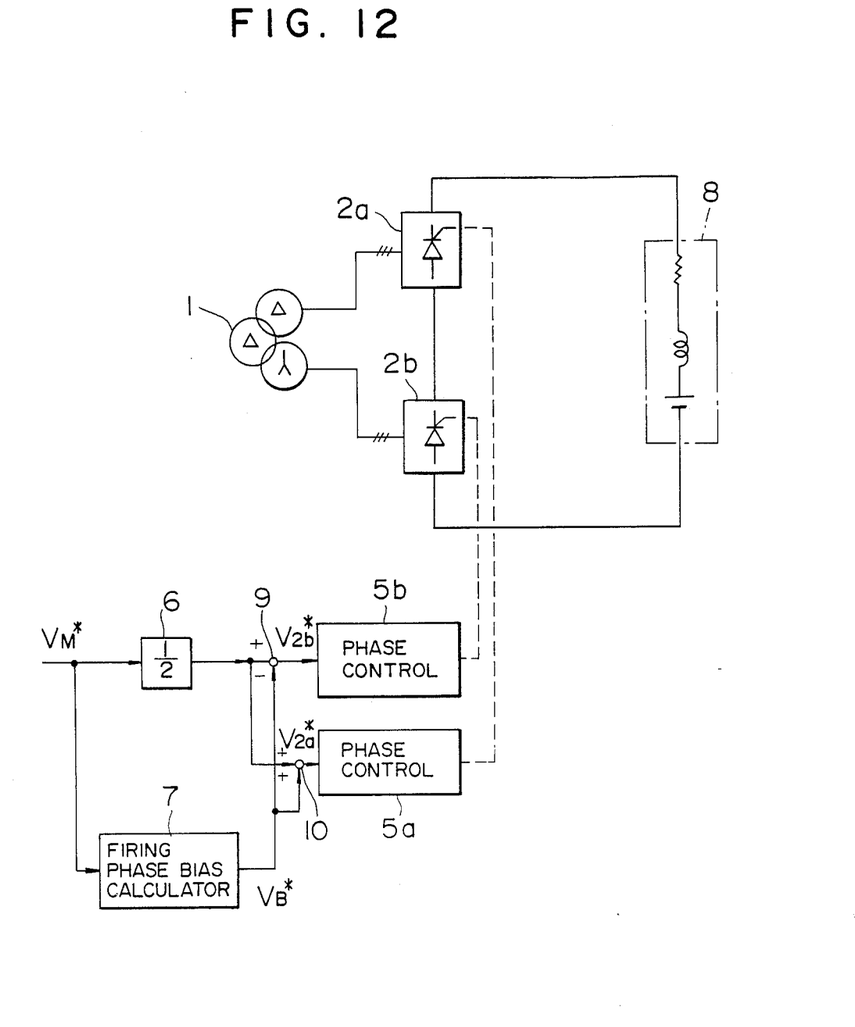
FIG. 12 is a view similar to FIG. 1 and shows a general arrangement of a cascaded converter circuit designed for supplying an electric power to a DC motor.

FIG. 12 is a view showing schematically a general arrangement of a cascaded converter circuit together with a control circuitry according to another embodiment of the invention. Difference from the arrangement shown in FIG. 1 is seen in that the load is constituted by a DC motor 8. In the case of the DC motor, the ripple component in the output voltage of the cascaded converter circuit makes appearance in the form of a current pulsation, which provides a cause for occurrence of ripple in the motor speed and brush-commutation failure. By adopting the teaching of the present invention, ripple in the output voltage of the cascaded converter circuit can be suppressed to a minimum, whereby the DC motor can be operated with the minimum current ripple.

As will be appreciated from the foregoing description, it is possible to minimize the ripple component in the output voltage of the cascaded converter circuit constituted by a plurality of unit converters connected in cascade. Further, since the operating point of the unit converter can be set in the vicinity of the maximum output voltage of positive or negative polarity, the power factor of the power supply source for the cascaded converter circuit can be improved while reducing ripple in the motor torque as well as the electromagnetic noise.

Although the foregoing description has been made on the assumption that the unit converter is of three-phase type, it should be understood that similar advantageous effects can be attained even when the unit converter is six-phase or twelve-phase type and/or when the unit converters are connected in cascade in more than two stages. Besides, although the firing phase bias voltage is arithmetically determined and reversed in polarity before being applied with a view to ensuring the firing phase difference between the unit converters, it should be understood that the invention is never restricted to such arrangement. By way of example, relations between the voltage command $v_u^*$ and the firing phase angles of the individual unit converters may be arithmetically determined beforehand so that phase of the voltage ripple assumes predetermined angular values, wherein the relations thus determined are stored in memory. Then, the firing phase can be regulated by reading out from the memory the firing phase angle corresponding to the voltage command $v_u^*$ being validated.

We claim:

1. A converter circuit control apparatus, comprising:
   a cascaded converter circuit composed of at least two unit converters connected in cascade;
   a load supplied with electric power from said cascaded converter circuit;
   phase control means each provided in association with each of said unit converters for controlling firing phase of the associated unit converter in accordance with a voltage command signal; and
   firing phase adjusting means for adjusting the firing phases controlled by said phase control means so that phases of ripple components in the output voltages of said unit converters are maintained at a predetermined angular difference.

2. A converter circuit control apparatus according to claim 1, wherein said firing phase regulating means includes bias arithmetic means for applying the firing phase bias signals to said phase control means, respectively, with polarities opposite to each other, magnitude of said firing phase signal being so set that phases of the voltage ripples of said unit converters assume a predetermined angular difference therebetween.

3. A converter circuit control apparatus according to claim 1, wherein each of said unit converters is constituted by a three-phase full-wave bridge circuit, wherein said predetermined angular difference is set at either 30° or 90°.

4. A converter circuit control apparatus according to claim 3, wherein a voltage ratio of magnitude of said voltage command signal ($v_u^*$) to the maximum output voltage ($E_{dm}$) of said unit converter is determined,
   said predetermined angular difference being set at 90° when said voltage ratio is not greater than said predetermined value, while said predetermined angular difference is set at 30° when said voltage ratio is not smaller than said predetermined value.

5. A converter circuit control apparatus according to claim 1, further including means for sharing magnitude of said voltage command signal ($v_u^*$) equally between said at least two unit converters, wherein each of said phase control means controls the firing phase in accordance with the voltage signal resulting from said equal sharing.

6. A converter circuit control apparatus according to claim 1, the number of said unit converters connected in cascade being two, wherein one of said unit converter is supplied with electric power from a transformer wired in Y-connection, while the other unit converter in supplied with electric power from a transformer wired in delta-connection.

7. A converter circuit control apparatus, comprising:
   a cascaded converter circuit composed of at least two unit converters connected in cascade;

a load supplied with electric power from said cascaded converter circuit;

means for sharing a magnitude of a voltage command signal equally between said at least two unit converters connected in cascade;

phase control means each provided in association with each of said unit converters for controlling firing phase of the associated unit converter in accordance with said equally shared voltage command signal; and bias arithmetic means for determining arithmetically a firing phase bias signal in accordance with said voltage command signal so that a difference in firing phase between said unit converters is substantially 120° when one of a magnitude and maximum value of said voltage command signal is not larger than a predetermined value and 60° when the one of the magnitude and maximum value of said voltage command signal exceeds the predetermined value and applying said firing phase bias signal to said phase control means, respectively, with polarities opposite to each other.

8. A converter circuit control apparatus according to claim 7, wherein said predetermined value is one fourth of a maximum output voltage of the unit converter.

9. A converter circuit control apparatus, comprising:

a cascaded converter circuit composed of at least two unit converters connected in cascade;

a load supplied with electric power from said cascaded converter circuit;

means for sharing a magnitude of a voltage command signal equally between said at least two unit converters connected in cascade;

phase control means each provided in association with each of said unit converters for controlling firing phase of the associated unit converter in accordance with said equally shared voltage command signal; and bias arithmetic means for determining arithmetically a firing phase bit signal in accordance with said voltage command signal and applying said firing phase bias signal to said phase control means, respectively, with polarities opposite to each other;

wherein said bias arithmetic means is so arranged as to determine a voltage ratio ($\gamma$) of said magnitude ($v_u^*$) of said voltage command signal to a maximum output voltage ($E_{dm}$) of unit converter to thereby arithmetically determine said firing phase bias signal in accordance with said voltage ratio; and wherein said voltage ratio ($\gamma$) is determined in accordance with $$\gamma = \frac{v_u^*}{2 \cdot E_{dm}}$$

said firing phase bias signal ($v_B$) being arithmetically determined in accordance with $$v_B = \frac{\sqrt{3}}{2} E_{dm} \sqrt{1 - 4\gamma^2}$$

when $\gamma \leq \frac{1}{4}$, while when $\gamma \geq \frac{1}{4}$, said firing phase bias signal ($v_B$) being determined in accordance with $$v_B = \frac{1}{2} E_{dm} \sqrt{1 - \frac{4}{3}\gamma^2}.$$

10. A converter circuit control apparatus, comprising:

a cascaded converter circuit composed of at least two unit converters connected in cascade;

a load supplied with electric power from said cascaded converter circuit;

means for sharing a magnitude of a voltage command signal equally between said at least two unit converters connected in cascade;

phase control means each providing in association with each of said unit converters for controlling firing phase of the associated unit converter in accordance with said equally shared voltage command signal; and bias arithmetic means for determining arithmetically a firing phase bias signal in accordance with said voltage command signal and applying said firing phase bias signal to said phase control means, respectively, with polarities opposite to each other;

wherein said bias arithmetic means is so arranged as to determine a voltage ratio ($\gamma$) of said magnitude ($v_u^*$) of said voltage command signal to a maximum output voltage ($E_{dm}$) of said unit converter to thereby arithmetically determine said firing phase bias signal in accordance with said voltage ratio; and wherein voltage command signals ($v_u^*$, $v_v^*$, $v_w^*$) for individual phases are applied as inputs, said voltage ratio ($\gamma$) being determined in accordance with $$\gamma = \frac{v_u^*}{2 \cdot E_{dm}}$$

and wherein when a maximum voltage ratio ($\gamma_m$) is represented by $$\gamma_m = \frac{1}{2 \cdot E_{dm}} \sqrt{\frac{2}{3}(v_u^{*2} + v_v^{*2} + v_w^{*2})}$$

said firing phase bias signal ($v_B$) is arithmetically determined in accordance with $$v_B = \frac{\sqrt{3}}{2} E_{dm} \sqrt{1 - 4\gamma^2}$$

when $\gamma_m \leq \frac{1}{4}$, while when $\gamma_m > \frac{1}{4}$, said firing phase bias signal ($v_B$) is determined in accordance with $$v_B = \frac{\sqrt{3}}{2} E_{dm} \sqrt{1 - 4\gamma^2}$$

11. A converter circuit control apparatus, comprising:

a three-phase transformer having output windings of Y-connection and delta-connection, respectively, on the secondary side;

a first three-phase converter supplied with electric power from said output winding of delta-connection;

a second three-phase converter supplied with electric power from said output winding of Y-connection;

a load supplied with electric power by a converter circuit constituted by said first and second three-phase converters connected in cascade;

phase control means provided for said first and second three-phase converters for controlling firing phases of the associated three-phase converters, respectively, in dependence on a voltage command signal; and bias arithmetic means for applying firing phase bias signals to said phase control means with polarities opposite to each other so that a predetermined angular difference is maintained between the phases of the ripple components in the output voltages of said first and second three-phase converters.

12. A converter circuit control apparatus according to claim 11, wherein said predetermined angular difference is 90° or 30°.

13. A converter circuit control apparatus according to claim 11, wherein said firing phase bias signals are so set that phase difference between said first and second three-phase converters is 120° or 90°.

14. A converter circuit control apparatus according to claim 13, wherein when a voltage ratio ($\gamma$) of magnitude of said voltage command signal ($v_u^*$) to the maximum output voltage ($E_{dm}$) of said three-phase converter is not greater than 0.25, said firing phase bias signal is so set that the phase difference between said first and second three-phase converters is 120°, while when said voltage ratio ($\gamma$) is greater than 0.25, said firing phase bias signal is so set that phase difference between said first and second three-phase converters is 60°.

* * * * *